(12) United States Patent
Iacovone et al.

(10) Patent No.: US 10,710,480 B2
(45) Date of Patent: Jul. 14, 2020

(54) CONDITIONING SYSTEM WITH BLOWER CONNECTION ASSEMBLY INCLUDING A DISTRIBUTION MEMBER AND METHOD OF ATTACHMENT

(71) Applicant: GENTHERM GMBH, Odelzhausen (DE)

(72) Inventors: Peter Daniel Iacovone, Amherstburg (CA); Cristian Nicolae Banu, LaSalle (CA)

(73) Assignee: GENTHERM GMBH, Odelzhausen (DE)

( * ) Notice: Subject to any disclaimer, the term of this patent is extended or adjusted under 35 U.S.C. 154(b) by 265 days.

(21) Appl. No.: 15/898,974

(22) Filed: Feb. 19, 2018

(65) Prior Publication Data

US 2018/0361892 A1  Dec. 20, 2018

Related U.S. Application Data

(60) Provisional application No. 62/519,752, filed on Jun. 14, 2017.

(51) Int. Cl.
*B60N 2/56* (2006.01)
*B60N 2/70* (2006.01)
(Continued)

(52) U.S. Cl.
CPC ............. *B60N 2/5657* (2013.01); *B60N 2/50* (2013.01); *B60N 2/5628* (2013.01); *B60N 2/5635* (2013.01); *B60N 2/5642* (2013.01); *B60N 2/5685* (2013.01); *B60N 2/5825* (2013.01); *B60N 2/5875* (2013.01); *B60N 2/5883* (2013.01); *B60N 2/682* (2013.01); *B60N 2/70* (2013.01); *B60N 2/68* (2013.01)

(58) Field of Classification Search
CPC ...... B60N 2/5657; B60N 2/50; B60N 2/5628; B60N 2/5635; B60N 2/5642; B60N 2/5685; B60N 2/5825; B60N 2/5875; B60N 2/5883; B60N 2/682; B60N 2/70
See application file for complete search history.

(56) References Cited

U.S. PATENT DOCUMENTS 2,931,286 A  4/1960  Fry, Sr. et al.
4,259,896 A  4/1981  Hayashi et al.
(Continued)

FOREIGN PATENT DOCUMENTS

DE  1995497 U  10/1968
EP  1075984 B1  5/2003
(Continued)

OTHER PUBLICATIONS

JP Office Action, Application No. 2018-100980, dated May 10, 2019.
(Continued)

*Primary Examiner* — Anthony D Barfield
(74) *Attorney, Agent, or Firm* — The Dobrusin Law Firm, P.C.

(57) ABSTRACT

A blower connection assembly comprising: (a) a distribution member; (b) a connection adapter connected to the distribution member; and (c) a blower that is connected to the distribution member via the connection adapter; and wherein a portion of a seat suspension extends between the connection adapter and the blower to support the connection adapter, the blower, and the distribution member.

20 Claims, 7 Drawing Sheets

(51) Int. Cl.
    *B60N 2/68*         (2006.01)
    *B60N 2/50*         (2006.01)
    *B60N 2/58*         (2006.01)

(56) References Cited

U.S. PATENT DOCUMENTS

| | | | |
|---|---|---|---|
| 4,923,248 A | 5/1990 | Feher | |
| 5,626,021 A | 5/1997 | Karunasiri et al. | |
| 6,003,950 A | 12/1999 | Larsson | |
| 6,048,024 A | 4/2000 | Wallman | |
| 6,064,037 A | 5/2000 | Weiss et al. | |
| 6,164,719 A | 12/2000 | Rauh | |
| 6,439,658 B1 | 8/2002 | Ganz et al. | |
| 6,464,468 B2 | 10/2002 | Colburn | |
| RE38,128 E | 6/2003 | Gallup et al. | |
| 6,619,736 B2 | 9/2003 | Stöwe et al. | |
| 6,626,488 B2 | 9/2003 | Pfahler | |
| 6,629,724 B2 | 10/2003 | Ekern et al. | |
| 6,676,207 B2 | 1/2004 | Rauh et al. | |
| 6,719,534 B2 | 4/2004 | Aoki et al. | |
| 6,761,399 B2 | 7/2004 | Bargheer et al. | |
| 6,840,576 B2 | 1/2005 | Ekern et al. | |
| 6,857,697 B2 | 2/2005 | Brennan et al. | |
| 6,869,139 B2 | 3/2005 | Brennan et al. | |
| 6,869,140 B2 | 3/2005 | White et al. | |
| 6,976,734 B2 | 12/2005 | Stoewe | |
| 7,040,710 B2 | 5/2006 | White et al. | |
| 7,083,227 B2 | 8/2006 | Brennan et al. | |
| 7,100,978 B2 | 9/2006 | Ekern et al. | |
| 7,213,876 B2 | 5/2007 | Stoewe | |
| 7,290,759 B1 | 11/2007 | Lavrencik | |
| 7,338,117 B2 | 3/2008 | Iqbal et al. | |
| 7,356,912 B2 | 4/2008 | Iqbal et al. | |
| 7,413,248 B2 | 8/2008 | Matsuhashi | |
| 7,452,028 B2 | 11/2008 | Knoll et al. | |
| 7,475,938 B2 | 1/2009 | Stoewe et al. | |
| 7,478,869 B2 | 1/2009 | Lazanja et al. | |
| 7,506,938 B2 | 3/2009 | Brennan et al. | |
| 7,510,239 B2 | 3/2009 | Stöwe | |
| 7,587,901 B2 | 9/2009 | Petrovski | |
| 7,618,089 B2 | 11/2009 | Stoewe et al. | |
| 7,637,569 B2 | 12/2009 | Krobok et al. | |
| 7,735,932 B2 | 6/2010 | Lazanja et al. | |
| 7,862,113 B2 | 1/2011 | Knoll | |
| 7,905,545 B2 | 3/2011 | Andersson | |
| 8,998,311 B2 | 4/2015 | Aakov | |
| 9,173,500 B2 | 11/2015 | Squires | |
| 9,926,935 B2 | 3/2018 | India | |
| 2004/0198212 A1 | 10/2004 | Aoki et al. | |
| 2005/0093347 A1 | 5/2005 | Bajic et al. | |
| 2006/0290176 A1 | 12/2006 | Aoki | |
| 2009/0218855 A1 | 9/2009 | Wolas | |
| 2013/0300179 A1 | 11/2013 | Ota | |
| 2013/0328359 A1 | 12/2013 | Antonov | |
| 2016/0356279 A1 | 12/2016 | Xu | |
| 2018/0319298 A1 | 11/2018 | Sikorski | |
| 2018/0361893 A1 | 12/2018 | Iacovone | |

FOREIGN PATENT DOCUMENTS

| | | |
|---|---|---|
| EP | 1323573 A2 | 7/2003 |
| FR | 2630056 A1 | 10/1989 |
| JP | 2003-165325 A | 6/2003 |
| JP | 2005-029085 A | 2/2005 |
| JP | 2006-176059 A | 7/2006 |
| JP | 2013-023003 A | 2/2013 |
| JP | 2013-124000 A | 6/2013 |
| KR | 10-1488179 B1 | 1/2015 |
| SE | 0102983 C2 | 3/2003 |

OTHER PUBLICATIONS

Co-pending U.S. Office Action, U.S. Appl. No. 15/898,970, dated Jul. 11, 2019.

Potentially Related Application, U.S. Appl. No. 15/898,970, filed Feb. 19, 2018.

Korean Notice of Allowance, Application No. 10-2018-0067988, dated Dec. 17, 2019.

CONDITIONING SYSTEM WITH BLOWER CONNECTION ASSEMBLY INCLUDING A DISTRIBUTION MEMBER AND METHOD OF ATTACHMENT

FIELD

The present teachings relate generally a trim bag that provides climate control, and more specifically a blower connection assembly including one or more distribution members for attaching a blower to an insert and a vehicle seat so that the vehicle seat is conditioned.

BACKGROUND

For many years, industry has been concerned with designing improved conditioning systems for articles of manufacture such as seats, steering wheels, automotive vehicles, or other transportation vehicles and connecting the conditioning system within the article of manufacture. The conditioning systems may push air through the article of manufacture or pull air through the article of manufacture in order to heat or cool the article of manufacture. The conditioning system may include one or more heaters, one or more fans, one or more thermoelectric devices, or a combination thereof. Examples of such conditioning systems are disclosed in U.S. Pat. Nos. 6,003,950; 6,048,024; 7,735,932; and 7,862,113 all of which are expressly incorporated herein by reference for all purposes. Many systems include a conditioner that is located on a top of a seat with a blower that is located on a bottom of the seat such that air is moved from a remote location to the insert to distribute the air. Some systems include an extended tail that extends from a location on top of the seat to a location behind or under the seat where a blower is located. These systems include a blower that is connected to the seat frame and the tail connects the inset to the blower.

What is needed is a blower connection assembly that allows for movement of the vehicle seat relative to the blower without locking fluid communication with the blower. What is needed is a blower connection assembly including a baffle that extends and retracts during movement by an occupant, a comfort system, a massage system, or a combination thereof. It would be desirable to have a blower connection assembly that directly connects to a frame of a vehicle seat. What is needed is a blower connection assembly that indirectly connects to a frame of a vehicle seat. It would be desirable to have a blower connection assembly that sandwiches a seat frame between a blower and one or more distribution members.

SUMMARY

The present teachings include: a blower connection assembly comprising: (a) a distribution member; (b) a connection adapter connected to the distribution member; and (c) a blower that is connected to the distribution member via the connection adapter; and wherein portion of a seat suspension extends between the connection adapter and the blower to support the connection adapter, the blower, and the distribution member.

The present teachings include: a blower connection assembly comprising: (a) a distribution member that extends into and connects to a portion of a seat suspension; and (b) a blower that connects to the portion of the seat suspension so that the distribution member and the blower are in fluid communication; and wherein a blower seat of the distribution member is sandwiched between the blower and the portion of the seat suspension so that a seal if formed between the distribution member and the blower.

The present teachings include: a blower connection assembly comprising: (a) a distribution member; (b) a connection adapter connected to the distribution member and a portion of a seat suspension; and (c) a blower that is connected to the distribution member via the connection adapter; wherein the portion of the seat suspension extends between the connection and the blower to support the connection adapter, the blower, and the distribution member.

The present teachings provide a blower connection assembly that allows for movement of the vehicle seat relative to the blower without locking fluid communication with the blower. The present teachings provide a blower connection assembly including a baffle that extends and retracts during movement by an occupant, a comfort system, a massage system, or a combination thereof. The present teachings provide a blower connection assembly that directly connects to a frame of a vehicle seat. The present teachings provide a blower connection assembly that indirectly connects to a frame of a vehicle seat. The present teachings provide a blower connection assembly that sandwiches a seat frame between a blower and a one or more distribution members.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing an improved conditioning system suitable for integration into a vehicle. For example, the conditioning system may be integrated into or attached to carriers (e.g., members, structures, panels, floors, walls, or the like) of various articles of manufacture such as buildings, furniture, transportation vehicles, (e.g., boats, trains, airplanes, motorcycles, all terrain vehicles, busses, snowmobiles, or otherwise) or the like. Alternatively, the conditioning system may be integrated into or attached to various components of transportation vehicles such as seats, benches, panels, footwells, floor mats, or other components. Preferably, the conditioning system is integrated into a vehicle seat a front side or a rear side of a vehicle seat. More preferably, the conditioning system is integrated on a rear side (e.g., B-side of a vehicle seat).

The conditioning system is particularly suitable for integration into a seat of an automotive vehicle. More particularly, the conditioning system is suitable for integration with the seat portion with or without bolsters, back portion with or without bolsters, head rest portion, or a combination thereof. The conditioning system may be located between two layers of the seat. The conditioning system may be located under a fabric layer (e.g. cloth, leather, synthetic leather, or the like) and under a cushion or backrest (e.g. a foam support for the user). In one aspect, the present teachings employ a structure that makes it particularly suited for use beneath a perforated leather seat cover or perforated synthetic leather seat cover. The present conditioning system is particularly attractive for use in combination with a conditioned seat (e.g. a ventilated, actively cooled (such as by use of a thermoelectric device or module), or actively heated seat). The conditioning system may be integrated with the seat cover by way of sewing, gluing, or other methods. The conditioning system may be integrated with the seat foam support by way of moulding, gluing, or other attachment methods. Preferably, the conditioning system is included underneath the cushion of the seat and the cushion assists in distributing air from the conditioning system to an occupant, predetermined locations, or both. The conditioning system may adaptably move with the vehicle seat, the cushion, the ventilated trim bag, a top layer of the cushion, or a combination thereof. The conditioning system may move with a ventilated trim bag as the ventilated trim bag is moved by one or more expandable elements (e.g., massage devices) located within a vehicle seat. For example, a massage system may be located between the seat and the ventilated trim bag and as the massage system moves a distance between the seat and the ventilated trim bag may change such that a distance between a blower and the ventilated trim bag varies and the conditioning system may adapt to this change in distance. The conditioning system may include one or more blowers and one or more inserts (i.e., ventilated trim bags); one or more heaters, one or more thermoelectric devices, or a combination thereof that are in communication with one or more cushions of a vehicle seat. The conditioning system preferably is part of a seat assembly.

The seat assembly functions to support and protect an occupant of a vehicle. The seat assembly may include one or more cushions, one or more trim covers, one or more ventilated trim bags, one or more expandable elements, one or more blowers, or a combination thereof all connected together. The one or more ventilated trim bags may be located between a cushion and a blower.

One or more cushions of the seat may include ventilation, active cooling, active heating, or a combination thereof. The seat may include one or more air movers (i.e. blower) in fluid connection to the one or cushions so that air may be blown onto the user or so that air may be pulled away from the user. The cushion may be made of an open cell foam, a closed cell foam, or a combination of both. The cushion may include one or more through holes that air passes through. The cushion may act as a baffling system that directs a fluid to a location of interest. The cushion may be coupled to a ventilated trim bag and the ventilated trim bag may guide fluid flow to a location of interest. A top of the cushion may support a ventilated trim bag. A bottom of the cushion may be connected to a top of the ventilated trim bag. The cushion may be free of contact with a ventilated trim bag and the cushion may distribute the fluid flow. The cushion may be directly connected to the conditioning system, a one or more distribution members, a connection adapter, or a combination thereof. The cushion may be connected to or part of a conditioning system.

The conditioning system may be used in conjunction with an occupant sensor. An occupant sensor may be used on any seat in conjunction with a conditioning system. Preferably, an occupant sensor may only be used on passenger seats. The occupant sensor may be any type of occupant sensor that senses a passenger in a vehicle seat. The occupant sensor may be a membrane sensor, a capacitive sensor, a force sensor, a mass sensor, or a combination thereof. One or more expandable elements (e.g., massagers) may be located between the occupant sensor and the cushion, the ventilated trim bag, or both. A microprocessor may monitor the occupant sensor for a passenger. For example, the microprocessor may be attached to an occupant sensor and when the occupant sensor measures that the seat is free of an occupant the conditioning system may remain off even if all of the other conditions are met such as the conditioning system being turned on. The occupant sensor may be in contact with a ventilated trim bag. Preferably, the occupant sensor is located on a top of a cushion and the ventilated trim bag is located under the cushion.

The ventilated trim bag may be an insert, a bag, or both. One example of a ventilated trim bag is illustrated in U.S. Pat. No. 6,869,140, the teachings of which are expressly incorporated by reference herein for all purposes. The ventilated trim bag may include open edges. The ventilated trim bag may include one or more top layers and one or more bottom layers with one or more insert layers extending between the one or more top layers and the one or more bottom layers. The ventilated trim bag may include one or more holes in the one or more top layers, one or more bottom layers, or both. The ventilated trim bag may include cutouts, internal slits, external slits, voids, apertures, carrier configuration, or the like may be shaped similarly or be aligned with the perforations in the seat cover. The ventilated trim bag may receive air from an air mover and distribute the air to predetermined locations. The ventilated trim bag may create an open space. The ventilated trim bag may resist crushing when an occupant sits in a vehicle seat. For example, the ventilated trim bag may not completely seal off and air may flow through an entire volume of the ventilated trim bag. The ventilated trim bag may be located on a top of a cushion or a bottom of a cushion. The ventilated trim bag may be a "B-side" trim bag. The ventilated trim bag may be part of a push system, a pull system, or a combination of both. The air may enter the ventilated trim bag through the bottom layer.

The bottom layer may function to allow air to enter into the ventilated trim bag and to direct air towards exit locations. The bottom layer may be permeable. Preferably, the bottom layer may be impermeable, include an impermeable coating, or both. The bottom layer may be a porous material. The bottom layer may be a film. The bottom layer may be made of a polymeric material. The bottom layer may be made of polyester, biaxially oriented polyethylene terephthalate, polyvinyl fluoride, polyethylene, polypropylene, nylon, polyvinyl chloride, or a combination thereof. The bottom layer and the top layer may be made of the same material. The bottom layer may be one or more layers. Preferably, the bottom layer is a single layer. The bottom layer may be separated from a top layer by an insert layer.

The insert layer may function to create an open space between the top layer and the bottom layer. The insert layer may prevent the bottom layer and the top layer from being moved into contact. The insert layer may be a mesh material. The insert layer may resist compression. The insert layer may form a space for air to move through the ventilated trim bag. One example of a preferred material of the insert layer is 3Mesh® spacer material manufactured by Mueller Textile of Wiehl, Germany. The insert layer may be one or more layers of material. Preferably, the insert layer is a single layer of material that is located between the top layer and the bottom layer.

The top layer may function to distribute air flow to predetermined locations. The top layer may include one or more holes. The top layer may include a plurality of holes. The one or more holes may be aligned with holes in a cushion, a trim layer, or both. The one or more holes may deliver fluid to predetermined locations. The one or more holes may distribute air from the ventilated trim bag to locations that correspond with regions of an occupant (e.g., lower back or legs). The one or more holes may be an absence of material. The one or more holes may be formed by removing material. The one or more holes may be formed by cutting the top layer. The top layer and the bottom layer may be connected together around edges to form a seam. The top layer and bottom layer may be ultrasonically bonded together, melted together, glued together, heat staked, sewn, stitches, or a combination thereof.

The heater may include a protective layer. The protective layer may extend over the top layer, the bottom layer, or both the top layer and the bottom layer. The top layer, the bottom layer, or both may be made of the protective layer. The protective layer may form substantially all of the top layer or the bottom layer. For example, the protective layer may be a fleece that includes an adhesive or a polymeric film that prevents fluid from passing through the protective layer. The protective layer may protect a film or an adhesive from stretching, breaking, being pierced, or a combination thereof. The protective layer may be made of a woven or unwoven material such as polyester, fleece, polypropylene, rayon, nylon, wool, linen, cotton, any combination thereof, or the like. The protective layer may be a fourth layer or a fifth layer that may be breathable or non-breathable. Preferably, the protective layer is a breathable polyester. The size, shape, and configuration of the protective layer may substantially mirror the size, shape, and configuration of the cushion, holes in the cushion, or both. The protective layer may be on one or both sides of the ventilated trim bag. The protective layer may be held on the ventilated trim bag by an adhesive, a mechanical fastener, or both. The protective layer may be connected to the top layer, the bottom layer, or both to connect the protective layer to the ventilated trim bag. The protective layer may have a bulk density that is about 0.6 g/cm3 or less, about 0.4 g/cm3 or less, about 0.2 g/cm3 or less, or even about 0.10 g/cm3 or less (i.e. about 0.15 g/cm3 to about 0.04 g/cm3). The ventilated trim bag may be free of a protective layer. The protective layer may be joined together to form a portion of the seam.

The seam may function to create sealed edges so that air can only leave the ventilated trim bag through predetermined locations. The one or more seams may extend along each edge of the ventilated trim bag so that a completely sealed bag is formed. The one or more seams may extend along only longitudinal edges or lateral edges. The seams may be free of any of the insert layers. The seams may extend beyond the insert layer so that the insert layer is entirely located between the top layer and the bottom layer. Preferably, the one or more seams extend around a periphery of the ventilated trim bag so that all edges of the ventilated trim bag substantially prevent air leakage. The one or more seams, the ventilated trim bag, or both may include one or more connection holes.

The one or more connection holes may function to align a ventilated trim bag with a cushion, to connect a ventilated trim bag to a cushion, to connect a ventilated trim bag to a blower, connect the ventilated trim bag to one or more distribution members, or a combination thereof. The one or more connection holes may extend through any portion of the ventilated trim bag. The one or more connection holes may extend through a seam, extra material, an ear along one or more edges of the ventilated trim bag, or a combination thereof. The one or more connection holes may only be used to align the trim bag with the cushion, holes in the cushion, or both. The one or more connection holes may receive a fastener. The one or more connection holes may be free of connection and may be used for alignment by temporarily being contacted during attachment. The ventilated trim bag may be adhesively connected to the cushion. For example, a two-faced tape, liquid adhesive, adhesive film, or a combination thereof may connect the ventilated trim bag to the cushion. The blower, housing, or both may assist in connecting the ventilated trim bag to the cushion. The ventilated trim bag may include one or more attachment rings that allow air to be introduced into the ventilated trim bag without air escaping from the ventilated trim bag.

The one or more attachment rings may function to fluidly connect the ventilated trim bag with a blower, a housing of the blower, one or more distribution members, a connection adapter, or a combination thereof. The one or more attachment rings may assist in providing fluid communication with an inlet or an outlet of a housing or a blower or preferably be in communication with one or more distribution members that is connected to a blower. The one or more attachment rings may connect to any part of a ventilated trim bag that makes a connection between a blower and the ventilated trim bag. The one or more attachment rings may be part of a top layer, a bottom layer, an insert layer, or a combination thereof. The one or attachment rings may be part of a top layer or a bottom layer of the ventilated trim bag and may allow the inlet or the outlet of the blower to fixedly connect to the ventilated trim bag so that air is prevented from leaking, the trim bag and the blower become one unit, the blower is at least partially suspended from the ventilated trim bag by the attachment ring, or a combination thereof. The one or more attachment rings may be integrated into a bottom layer or a top layer. The one or more attachment rings may be connected within the bottom layer or the top layer via adhesive, bonding, a mechanical faster, sewing, stitching, or a combination thereof. The one or more attachment rings may include one or more attachment recesses that receive one or more tabs of a blower, a housing, or both. Preferably, the attachment rings provide a seat that the one or more distribution members sits within so that the one or more distribution members and the ventilated trim bag are maintained in contact.

The one or more attachment recesses may function to connect a blower to the ventilated trim bag. The one or more attachment recesses may be in communication with one or more distribution members so that the inlet or the outlet of the blower is in communication with the ventilated trim bag. The one or more attachment recesses may be rigid. The one or more attachment recesses may be flexible so that a fixed connection may be formed between the one or more distribution members, the blower, or both and the ventilated trim bag. The one or more attachment recesses may assist in preventing fluid leakage between the blower and the ventilated trim bag by retaining the one or more distribution members, the blower, or both proximate to the ventilated trim bag.

The one or more air movers (air movers and blowers are used interchangeably herein) may function to add or remove fluid from a predetermined location to provide conditioning to the predetermined location. The blower functions to push air, pull air, or both. The one or more blowers may move air through one or more ventilated trim bags that are located within or overlay the backrest cushion, seat cushion, or both. Preferably, the conditioning system or blowers taught herein is connected to a bun or cushion of a vehicle seat. The blower may be movable with the cushion, the ventilated trim bag, or both as an occupant sits on the cushion or leaves the cushion. Preferably, the blowers are static and are connected to one or more distribution members that moves with the ventilated trim bag, the cushion, or both. The blower may be an axial fan. Preferably, the blower may be a radial fan. The blower may include one or more impellers that move air through the blower, the blower housing, the ventilated trim bag, or a combination thereof. The blower includes an inlet and an outlet. The inlet may be on the bottom side or the top side. Preferably, the inlet is in the top side of the blower. The inlet may face a bottom of the cushion. The inlet may be located under the ventilated trim big that extends along a rear surface of the cushion (i.e., B-side). The inlet or the outlet is connected to the ventilated trim bag via the attachment ring or one or more distribution members. A gasket or one or more distribution members may extend between the blower and the ventilated trim bag. The gasket may allow the ventilated trim bag to move relative to the blower as the occupant moves. The gasket or one or more distribution members may be an elastomeric material (e.g., rubber). The inlet and outlet may allow air to move into and out of the housing.

The one or more blowers may include a Thermoelectric Device (TED). The TED may heat air as it enters the one or more blowers or as it leaves the one or more blowers. The TED may cool air as the air enters the one or more blowers or as the air leaves the one or more blowers. The one or more blowers may include a heating device, a cooling device, or both (i.e. a thermoelectric device (TED)). The TED may be used to heat air and/or cool air that is blown onto the user. The air mover and TED may be placed in the seat in many different configurations or in communication with a vehicle seat insert. For example, the TED and/or air mover may be used in any manner or any configuration with an insert described in any of U.S. Pat. Nos. RE38,128; 4,923,248; 6,629,724; 6,676,207; 6,857,697; 6,869,139; 6,869,140; 6,976,734; 7,083,227; 7,213,876; 7,338,117; 7,356,912; 7,475,938; 7,506,938; and 7,587,901 or U.S. Patent Application Publication No. 2009-0218855 the teachings of which are expressly incorporated by reference herein for all purposes. The TED and heater may both produce heat at the same time; however, it is contemplated that the TED or heater may be used separately. The heater may be used to produce heat in an active heating system in place of a TED. The heater, preferably, may not be used when the TED is used to cool the user. The air mover and TED may be used in conjunction with an insert (e.g., ventilated trim bag) disclosed herein so that air may be directed evenly and consistently to the user. The air may be blown through the insert, a heater, perforations in the seat cover (e.g. trim layer), holes or perforations in a cushion, or a combination thereof. Some examples air permeable seats and heating device are U.S. Pat. Nos. 6,064,037 and 6,869,140 both of which are incorporated by reference herein for all purposes. The TED may blow hot air while the heater contemporaneously heats the seat; thereby, providing both conduction heating and convection heating. The TED may be located within a housing of the blower, in a separate housing, or therebetween.

The housing functions to connect the blower within a system, direct air to a predetermined location, or both. The housing may function to connect the blower to the seat suspension, a wire frame, one or more distribution members, a connection adapter, or a combination thereof. The housing may connect the blower to a seat, a cushion, a frame, or a combination thereof. The housing may be rigid. The housing may be flexible. The housing may include rigid regions and flexible regions. The housing may include one or more integral parts (e.g., a part that is formed with the housing) that connect the housing, the blower, or both to a cushion, a ventilated trim bag, or both. The housing may include parts that are added to the housing after the housing is formed and the parts may assist in connecting the housing, the blower, or both to the cushion, a ventilated trim bag, or both. The housing may include one or more parts (e.g., clips or blower connectors). The one or more parts may be an integral part of the housing. The one or more parts may assist in aligning the inlet, the outlet, or both of the blower with one or more distribution members, a ventilated trim bag, a seat, or a combination thereof. The housing may include an inlet, an outlet, or both. The inlet, the outlet, or both may include one or more flanges.

The one or more flanges may function to guide air into the inlet, into the impeller, out of the outlet, between the blower and one or more distribution members, or a combination thereof. The one or more flanges may restrict airflow into the housing so that noise, vibration, harshness, or a combination thereof are reduced or prevented by the movement of air into the blower. The one or more flanges may form a mating connection with the blower connection assembly, the blower seat, or both. The one or more flanges may fit within the blower seat so that a sealed connection is formed between the one or more distribution members and the housing of the blower. The one or more flanges may radially curve inward towards a rotational axis of the impeller. The one or more flanges may reduce a cross-sectional length (e.g., diameter) as the flanges extend outward away from the housing. The one or more flanges may be complementary in shape to a connection assembly, a blower seat of one or more distribution members, or both.

The blower connection assembly may function to provide fluid communication between a ventilated trim bag and a blower. The blower connection assembly may connect all or a portion of a conditioning system within an article of manufacture such as a vehicle seat. The blower connection assembly preferably, connects a blower and one or more distribution members together. More preferably, the blower connection assembly connects the blower and the one or more distribution members together and connects them to a seat suspension. The blower connection assembly may include all or a portion of a blower housing, a connection adapter, one or more distribution members, blower, or a combination thereof. The blower connection assembly may include one or more attachment features (e.g., clips, tabs, hooks, or a combination thereof) that connect the blower, one or more distribution memberss, connection adapter, or a combination thereof together, to a seat suspension, a ventilated trim bag, or a combination thereof.

The one or more clips function to connect to a seat suspension, a connection adapter, one or more distribution members, a plate frame, or a combination thereof. The one or more clips may be an integral part of the housing, the connection adapter, or both. Preferably, the one or more clips are part of the housing of the blower and receive an adapter pivot of a connection adapter. The one or more clips and the housing and/or connection adapter may be formed at the same time so that the one or more clips and the housing are connected together. The one or more clips may be discrete from the housing. The one or more clips may be cantilever and extend from the housing and/or connection adapter. The one or more clips may be movable about a pivot point or create a pivot point. The one or more clips may be fixed (i.e., free of movement). The one or more clips may be hook shaped, "J" shaped, or both. The one or more clips may have a channel that locks the clip to a support. The one or more clips may have an open end and a closed end. The open end may receive a support or an adapter pivot that extends into or around the clip and is locked within the closed end of the clip. The one or more clips may include a lock that prevents a support or adapter pivot from being removed from the clip. The clip may be free of a lock. The clip may be retained in place by one or more tabs, one or more bands, or both. Some of the clips may be made with the housing and some of the clips may be added to the housing. Preferably, the one or more clips extend outward away from a center of an inlet, an axis of rotation or both. The one or more clips may be arcuate. The blower, the connection adapter, or both may be free of clips. The one or more clips may work in conjunction with one or more tabs, one or more fasteners, one or more seats, one or more blower connectors, one or more attachment apertures, or a combination thereof to form a connection between a blower and a connection adapter, one or more distribution members, or both. The one or more blowers, connection adapters, or both may be free of clips and may form a connection using tabs, fasteners, blower connectors, seats, attachment apertures, or a combination thereof.

The one or more tabs function to connect the blower to the ventilated trim bag, the attachment ring, the connection blower, the seat suspension, the wire frame, or a combination thereof. The one or more tabs may extend outward from the blower, housing, connection adapter, or a combination thereof. The one or more tabs may extend cantilever from the housing or the connection adapter. The one or more tabs may be an integral part of the housing (e.g., the tabs and housing may be made at the same time and be a same piece), the connection adapter, or both. The one or more tabs may extend through the plate frame, the seat suspension, or both to connect the connection adapter to the blower. The one or more tabs may be located proximate to an inlet, an outlet, or both. The one or more tabs may assist in locking a blower to a connection adapter. The one or more tabs may be triangular in shape. The one or more tabs may be shaped like the number 4. The one or more tabs may be flexible so that the tabs may be extended into attachment recesses in the attachment ring, the plate frame, or both. The one or more tabs may lock to a wire frame, a plate frame, or both. The one or more tabs may be biased by contact with the attachment recess, the plate frame, the wire frame, the attachment aperture, or a combination thereof. The one or more tabs may extend into an attachment aperture so that the one or more tabs form a connection within the blower connection assembly. The one or more tabs may be a one-way fastener. For example, the tabs may include an angled portion that assists in entering the attachment recess and prevent the tabs from being removed from the attachment recess. The tabs may be equally spaced apart about an inlet or an outlet of the blower. The one or more tabs may be spaced about 30 degrees or more, about 45 degrees or more, about 60 degrees or more, or about 75 degrees or more, or about 90 degrees or more apart. The one or more tabs may be located about 180 degrees or less apart. The housing, the connection adapter, or both may include one or more tabs, two or more tabs, three or more tabs, four or more tabs, or even five or more tabs. The tabs may connect the blower to the ventilated trim bag, the connection adapter, the plate frame, the baffle, or a combination thereof. The one or more tabs may assist in connecting the baffle to the plate frame, connection adapter, or a combination thereof. The one or more tabs may extend directly into a blower connector, an attachment recess, or both. The one or more tabs may include a connection leg, a hook leg, or both so that that one or more tabs may be rotationally moved into a blower connector, an attachment recess, or both.

The one or more connection legs may function to form a connection between the tab and the housing, the connection adapter, or both. The one or more connection legs may form a cantilever connection with the housing, the connection adapter, or both. The one or more connection legs may extend from the housing, the connection adapter, or both. The one or more connection legs may extend parallel to the rotational axis of an impeller of a blower. The one or more connection legs may support one or more hook legs.

The one or more hook legs function to extend into a blower connector, an attachment recess, or both to create a connection between a blower and a connection adapter, one or more distribution members, plate frame, or a combination thereof. The one or more hook legs may extend at an angle relative to the one or more connection legs. The one or more hook legs may extend directly into the blower connector, an attachment recess, or both. The one or more hook legs may be rotationally moved into the blower connector, an attachment recess, or both. The one or more hook legs may rotate about the rotational axis of the impeller to form a connection. The one or more hook legs may prevent the blower, connection adapter, or both from being axially moved along the rotational axis of the blower, relative to plate frame, the one or more distribution members, or both. The hook legs may create a complementary fit with the blower connector, the connection adapter, or both.

The one or more connection adapters may function to connect one or more distribution members to a plate frame, a blower, or both. The one or more connection adapters function to connect one or more distribution members within the conditioning system. The one or more connection adapters may be over molded around the one or more distribution members or vice versa. The one or more connection adapters may assist in sealing the blower and the one or more distribution members to each other. The one or more connection adapter may have a portion that extends along a first side of a plate frame and a portion that extends along a second side of the plate frame. The one or more connection adapters may extend through the plate frame. The one or more connection adapters may extend around the plate frame. The one or more connection adapters may form a connection using only tabs and attachment apertures or blower connectors. The one or more connection adapters may include one or more clips, one or more adapter pivots, one or more adapter recesses, blower connectors, or a combination thereof. The one or more connection adapters may connect to both the plate frame and the blower. The one or more connection adapters may include one or more through holes. The one or more through holes may allow a fluid to move between one or more distribution members and a blower, receive fasteners, receive a hook, receive a tab, receive a portion of a seat suspension, connect to the one or more distribution members, or a combination thereof. The one or more connection adapters may me made of or include a polymer, metal, a thermoplastic, acrylonitrile butadiene styrene (ABS), polyethylene, polycarbonate, polyamide, nylon, polypropylene, acetal, polystyrene, rubber, an elastomer, or a combination thereof. The material of the connection adapter may be rigid. The material of the connection adapter may be sufficiently rigid so that if a fastener extends through an adapter recess the material is sufficiently strong to maintain the connection.

The one or more adapter recesses may function to receive one or more fasteners to connect the connection adapter, the blower, the plate frame, or a combination thereof. The one or more adapter recesses may receive one or more fasteners. The fasteners may be one or more screws, nails, rivets, threaded members, bolt, or a combination thereof. The one or more adapter recesses may be located on the connection adapter and align with one or more blower connectors. The one or more adapter recesses may be counter sunk so that the one or more fasters may be located flush within the connection adapter. The one or more adapter recesses may be part of the blower, part of the connection adapter, or both. The one or more adapter recesses may align with the one or more blower connectors so that one or more fasteners may extend there between and form a connection. Preferably, a single fastener extends through the adapter recesses and the blower connector to connect the blower and the connection adapter together. The one or more adapter recesses may be located adjacent to or opposite from one or more adapter pivots.

The one or more adapter pivots may function to form a movable connection with one or more clips. The one or more adapter pivots may extend around a clip. The one or more clips may extend into the adapter pivot. The adapter pivots may allow the connection adapter to pivot about the clip. The one or more adapter pivots may be part of the blower, the connection adapter, or both. The one or more adapter pivots may include a through hole that receives a clip. The one or more adapter pivots may assist the connection adapter in forming a removable connection with the blower. The one or more adapter pivots may extend over or around a clip so that the connection adapter is rotated towards the blower. The adapter pivot and the clip may allow the blower and the connection adapter to move relative to each other. The connection pivot may allow the blower and the connection adapter to pivot and sandwich a plate frame therebetween. The connection adapter may allow for rotational movement of the connection adapter relative to the blower but prevent the connection adapter from moving longitudinally, laterally, or both. The connection adapter may be located proximate to one or more connection fingers that assist in connected the connection adapter to the one or more distribution members.

The one or more connection fingers function to assist the one or more distribution members to connect to the connection adapter. The one or more connection fingers may fit within a groove within the one or more distribution members. The one or more connection fingers may extend into a groove within the one or more distribution members when the connection adapter is over molded to the one or more distribution members or vice versa. The one or more connection fingers may prevent the one or more distribution members from being removed from the connection adapter. The connection fingers may assist the one or more distribution members in creating a sealed connection with the blower by pressing the blower seat of the one or more distribution members into contact with the blower.

The one or more distribution members function to create a fluid path between a blower and a ventilated trim bag, cushion, occupant, or a combination thereof. The one or more distribution members may provide a flexible fluid path between a blower and a blower and a ventilated trim bag, cushion, occupant, or a combination thereof. The one or more distribution members may shorten or lengthen as components of the vehicle, vehicle seat (e.g., expandable elements), conditioning system or a combination thereof. For example, if a vehicle seat includes one or more massage elements that move up and down a gap between the blower and a ventilated trim bag may vary with the massage elements and the one or more distribution member may movably adjust so that continuous fluid communication is maintained continuously. The one or more one or more distribution members may be compressible, expandable, or both. Preferably, the one or more distribution members may be a bellow. The one or more distribution members may be compressed or pre-compressed to be installed within the conditioning system. For example, the distribution member may be compressed so that the distribution member fits in a space between the frame and/or blower and the ventilated trim bag and/or cushion. As the cushion, the ventilated trim bag, the blower, the frame, or a combination thereof move, the distribution member may expand to maintain a fluid connection between the blower and the ventilated trim bag. The air distribution members may be free of a fixed connection with the ventilated trim bag. As the one or more massage elements inflate and deflate the one or more distribution members may be expanded and contracted. A fastener may extend through a portion of the one or more distribution member to connect the one or more distribution member to a plate frame. For example, the one or more distribution member may include an adapter recess that receives a fastener and the fastener may extend through the fastener recess into the plate frame to form a fixed connection. The one or more one or more distribution members may be made of an elastomeric material, a rigid material that includes expansion joints, or both. Preferably, the one or more one or more distribution members are made of or include rubber, nitrile rubber, styrene butadiene rubber, silicone rubber, butyl rubber, polybutadiene, natural rubber, isoprene rubber, an elastomer, silicone, or a combination thereof. The one or more one or more distribution members may be round, square, rectangular, or a combination thereof. The one or more distribution members may be conical in shape. The one or more distribution member may taper from one end to another end. The one or more distribution member may taper from a trim bag seat to a blower seat. The one or more distribution member at the trim bag seat may have a larger cross-sectional thickness (e.g., diameter or average length) than the one or more distribution member at the blower seat. Each of the one or more one or more distribution members may be in communication with one blower. The one or more one or more distribution members may be connected to a plate frame, a connection adapter, or both. The one or more distribution members may be connected to the connection adapter by one or more locking features.

The one or more locking features may function to connect to the one or more distribution member to a connection adapter. The one or more locking features may function to connect one or more distribution member to a plate frame, the seat suspension, or both. The one or more locking features may receive one or more connection fingers during an over molding process. Preferably, the locking feature is a annular in shape and the connection features form a complementary fit to the one or more locking features. The one or more locking features may be a reduction in cross-sectional length forming a narrow neck region that prevents axial movement of the one or more distribution members relative to the plate frame, the connection adapter, or both. The narrow neck region may form a connection with a frame recess. The narrow neck region may connect to a connection recess. The locking feature may be located between two or more flares. For example, the one or more distribution members may be press fit into an aperture, a frame recess, or both until the locking feature is in contact with the aperture, frame recess, or both. The locking feature may be located between a flexible region and a blower seat. The locking feature may include one or more connection recesses, one or more overlap features, or both.

The connection recess may function to receive material of the connection adapter so that the connection adapter and the one or more distribution members form a fixed connection. The connection recess may be a narrow neck region. The connection recess may prevent the one or more distribution members from axially moving or axially being removed from a connection between the one or more distribution members and the plate frame, the connection adapter, or both. The connection recess may be a narrowest part of the one or more distribution members. The connection recess may be a narrow region which prevents axial movement of the one or more distribution members so that the one or more distribution members is retained in place. The connection recess may be formed by an overlap region extend parallel to an adjacent wall so that the recess is located between two walls.

The one or more overlap features function to sandwich a connection finger between two walls of the one or more distribution members. The one or more overlap features assist in forming a blower seat so that a portion of the one or more distribution members extends between the blower and the connection adapter. The one or more overlap features may form a complementary fit between the one or more distribution members and the connection adapter. The overlap feature may be an external wall. The overlap feature may be parallel to an inner wall. The overlap feature may be annular, square, rectangular, or a combination thereof. The one or more overlap features may overlap a connection finger so that a fixed connection or a removable connection is formed between the connection adapter and the one or more distribution members. The overlap feature may flex so that an interference fit may be formed between the one or more distribution members and the connection adapter. The one or more overlap features assist in forming a blower seat so that a portion of the one or more distribution members extends between the blower and the connection adapter.

The one or more blower seats may function to form a seal between the one or more distribution members, the connection adapter, or both and the blower. The one or more blower seats may allow the blower, the connection adapter or both to move relative to each other. The one or more blower seats may be an overlap of material. The one or more blower seats may be a piece of the one or more distribution members that extends around a portion of the connection adapter. The blower seat may create a seal proximate to the inlet, the outlet, or both of the blower. The blower seat may directly connect the blower, a flange of the blower, or both. The blower seat may compress as the one or more distribution members is connected to the blower. The blower seat may be sandwiched between the blower, plate frame, or both and the connection adapter, the plate frame, or both so that a seal if formed. The blower seat may extend around the wire frame, the plate frame, or both of the seat suspension. The blower seat may assist in creating a connection directly with the blower. The blower seat may assist in fully or partially directly connecting the one or more distribution members to the blower; in fully or partially indirectly connecting the one or more distribution members to the blower; connecting the one or more distribution members to the plate frame and to the blower; or a combination thereof. The blower seat may be a thickness of one or more distribution members material that is located between the connection adapter and the blower. The blower seat may be compressible, expandable, contractible, or a combination thereof. The blower seat may extend below the flexing joint and assist the one or more distribution members in flexing relative to the ventilated trim bag, the blower, the seat suspension, or a combination thereof.

The one or more flexing joint may function to maintain a fluid connection between a blower and a ventilated trim bag as the blower, the ventilated trim bag, or both move relative to each other. The flexing joint may be one flexible portion of a flexible region. Each flexing joint may expand and contract. There may be a plurality of flexing joints. The flexing joint may have a cross-sectional shape that is "C" shaped, "U" shaped, "S" shaped, or a combination thereof. The flexing joint may be a portion of a flexible region that expands and contracts. The flexing joint may be one part of an accordion shaped flexible region. The flexing joints may be stacked one on top of another. The flexing joints may be a plurality of annular rings that are stacked on each other to form a flexing joint The one or more flexing regions may function to maintain a fluid connection between a blower and a ventilated trim bag. The flexing regions may stretch and contract. The flexing regions may expand as one or more massage bags expand and contract. The one or more flexing regions may compress as a ventilated trim bag moves towards the blower (e.g., from compression by a user, deflation of a massage bag, or both). The one or more flexing regions may be a series of flexing joints connected together. The one or more flexing regions may have a cross-sectional shape that is serpentine in shape, "S" shaped, or both. The one or more flexing regions may be annular rings that that move relative to each other to expand and contract. The flexing regions may be pre-compressed so that as the ventilated trim bag moves away from the blower the one or more distribution members maintains a connection with the blower and the ventilated trim bag. The one or more flexing regions may be pre-compressed between a ventilated trim bag and a blower. The one or more flexing regions may be compressed when the one or more distribution members is located between blower and the ventilated trim bag. The one or more flexing regions may terminate at a trim bag seat that is on contact with a ventilated trim bag.

The one or more trim bag seats may function to form a connection with a ventilated trim bag. The one or more trim bag seats may directly connect with a ventilated trim bag. The one or more trim bag seats may extend around an inlet of a ventilated trim bag. The one or more trim bag seats may form a fixed connection with the ventilated trim bag. The one or more trim bag seats may form a friction connection with the ventilated trim bag. The one or more trim bag seats may be held in place by friction, compression, pre-compression, the connector adapter, or a combination thereof. The one or more trim bag seats may extend radially outward relative to the flexible region. The one or more trim bag seats may mushroom out over the flexible region. The one or more trim bag seats may be annular, oval, square, rectangular, or a combination thereof. The one or more trim bag seats may extend outward from a center of the one or more distribution members. The one or more trim bag seats may extend at an angle relative to a horizontal plane. The angle may be about 5 degrees or more, about 10 degrees or more, or about 15 degrees or more from a plane extending parallel to the connection adapter, the trim bag, or both. The angle may be about 45 degrees or less, about 30 degrees or less, or about 25 degrees or less from a plane extending parallel to the connection adapter, the trim bag, or both. The trim bag seat may include one or more stabilizing features.

The one or more stabilizing features may function to prevent bending, curling, folding, or a combination thereof of the trim bag seat. The one or more stabilizing features may assist the trim bag seat in maintaining its shape. The one or more stabilizing features may be an integral part of the trim bag seat. The one or more stabilizing features may located on a surface of the trim bag seat (e.g., a top or a bottom). The one or more stabilizing features may be made of the same material as the trim bas seat and may add rigidity to the trim bag seat. The one or more stabilizing features may be located within an internal portion of the trim bag seat. The one or more stabilizing features may be molded into the trim bag seat, over molded into the trim bag seat, or both. The stabilizing features may be metal, plastic, or another piece of rigid material. The stabilizing features may be linear, a cross, square, triangle, plus, "L" shaped, "T" shaped, or a combination thereof. The stabilizing features may maintain the trim bag seat within a plane. The stabilizing features may prevent movement of the trim bag seat as the trim bag seat is moved into contact with the cushion, the ventilated trim bag, or both.

The one or more cushions may function to support an occupant, a conditioning system, or both. The one or more cushions may direct fluid to a location of interest. The one or more cushions may include one or more channels. The one or more cushions may extend over a bottom or a back of a frame to form a portion of a vehicle seat. The one or more cushions may be made of an open cell foam, a closed cell foam, or both. The one or more cushions may be located between a trim layer and a frame. The one or more cushions may be located between an occupant and a conditioning system, a ventilated trim bag, a blower, or a combination thereof. The cushion may include one or more supports that assist in connecting a ventilated trim bag, a blower, or both to the cushion.

The seat suspension functions to support a cushion, occupant, ventilated trim bag, blower, or a combination thereof. The seat suspension may be a bottom of a vehicle seat, a back of a vehicle seat, or both. The seat suspension may be connected to a vehicle. All or a portion of the seat suspension may extend between the blower and the connection adapter, the one or more distribution members, or both. A portion of the seat suspension may be connected to the one or more distribution members, the blower, the connection adapter, or a combination thereof. The seat suspension may be free of a direction connection with the one or more distribution members, the connection adapter, the blower, or a combination thereof. For example, a tab, hook, fastener, or a combination thereof may be free of connection with the seat suspension. In another example, the blower, one or more distribution members, connection adapter, or a combination thereof may connect to each other and extend around the seat suspension and preferably a plate frame. The seat suspension may have a wire frame that movably supports the cushion, the occupant, the ventilated trim bag, or a combination thereof.

The wire frame may function to support an occupant, ventilated trim bag, cushion, blower, or a combination thereof. The wire frame may be one or more wires that extend along a width, length, or both of a seat suspension. The wire frame may connect to the seat frame. The wire frame may be straight, bent, serpentine, or a combination thereof. The one or more wire frames may be connected together by one or more plate frames.

The one or more plate frames may connect two or more wire frames together. The one or more plate frames may provide a planar piece within the seat suspension. The one or more plate frames may be a connection point. The one or more plate frames may introduce rigidity into the seat suspension. The one or more plate frames may include one or more through holes, frame recesses, or both. The one or more plate frames may support a blower, one or more distribution members, connection adapter, or a combination thereof. The one or more plate frames may be a planar plate within the seat suspension that directly or indirectly connects to the one or more distribution members, the connection adapter, the one or more distribution members, or a combination thereof. The one or more plate frames may include one or more frame recesses that connect the one or more distribution memberss, the tabs, the blower, the plate frame, or a combination thereof.

The one or more frame recesses may be a through hole in the plate frame. The frame recesses may allow for air to pass therethrough. The frame recess may receive a fastener, clip, tab, or a combination thereof. The frame recess may be one or more holes. The frame recess may be a plurality of through holes. The frame recess may be sandwiched between a blower and a connection adapter and/or one or more distribution members. The one or more distribution members may be connected to the plate frame, the blower, the connection adapter, the ventilated trim bag, or a combination thereof.

The process may include one or more of the following steps. The ventilated trim bag may be attached to the cushion. The ventilated trim bag may be attached to a top of the cushion or a bottom of the cushion. The ventilated trim bag may be connected to one or more distribution members. The one or more distribution members may be placed in alignment with an inlet in the ventilated trim bag. The one or more distribution members may be connected directly or indirectly to a frame recess a connection adapter, or both. The one or more distribution members may be compressed to fit between the ventilated trim bag and the plate frame, the connection adapter, or both so that the one or more distribution members is pre-compressed. The one or more distribution members may expand with the ventilated trim bag without a fixed connection to the ventilated trim bag. The one or more distribution members may form a friction fit with a plate recess, connection adapter, or both. The connection adapter may be over molded on the one or more distribution members. The connection adapter may connect to a clip. The connection adapter may connect to the plate frame, the blower, or both via one or more fasteners. The one or more tabs may extend into one or more attachment apertures, one or more frame recesses, blower connectors, or a combination thereof. The one or more tabs may twist relative to the frame recesses, the blower connectors, the attachment aperture, or a combination thereof. The plate frame may be sandwiched between the one or more distribution members, connection adapter, or both and the blower. The one or more distribution members may expand and contract with movement of the seat suspension, ventilated trim bag, cushion, or a combination thereof.

Figure 1:
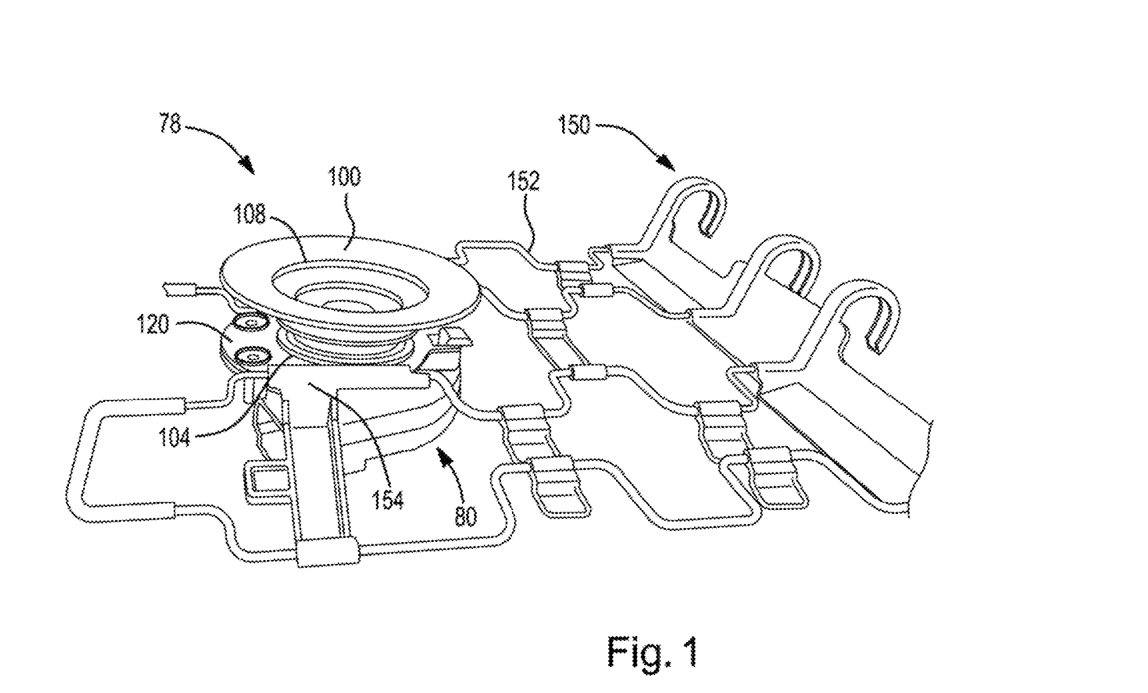
FIG. 1 is a blower connection assembly connected to a seat suspension.

FIG. 1 illustrates a blower connection assembly 78 connected to a seat suspension 150. The seat suspension 150 includes a wire frame 152 and a plate frame 154 with the blower connection assembly 78 connected to the plate frame 154. The blower connection assembly 78 includes a connection adapter 120 that connects a bellow 100 to a blower 80. The bellow 100 includes a trim bag seat 108 that connects to a trim bag (not shown) and a flexible joint 104 that allows the bellow 100 to move as an occupant moves in and out of contact with a component of the vehicle that includes the bellow 100 or as the ventilated trim bag is moved relative to the blower 80 so that the bellow 100 assists in maintaining fluid communication between the ventilated trim bag and the blower 80.

Figure 2:
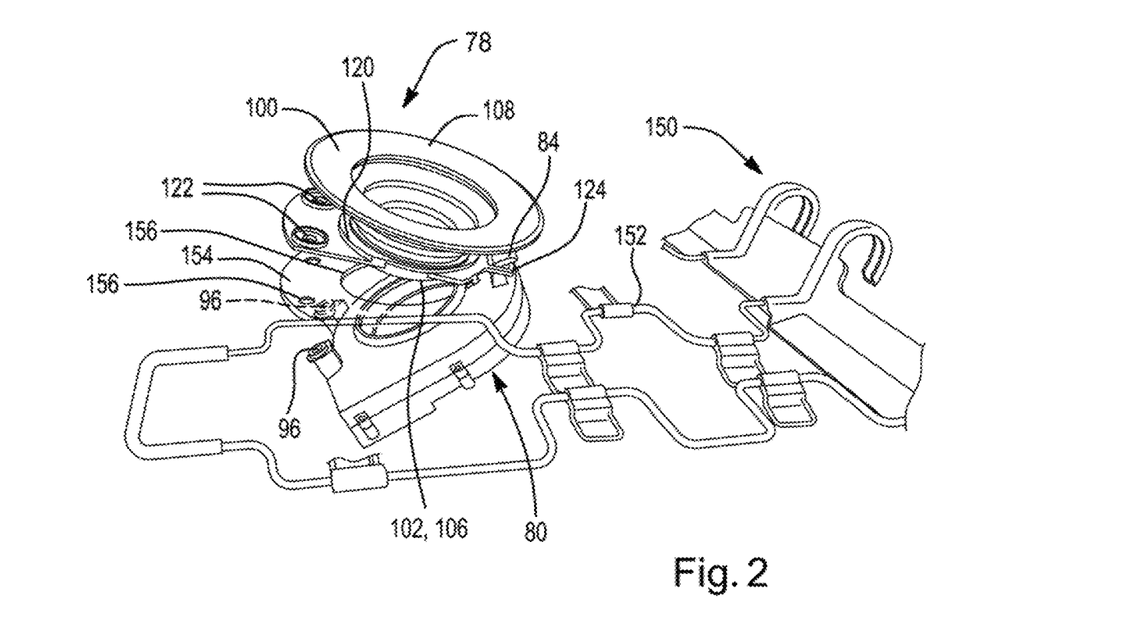
FIG. 2 is a perspective view of a blower connection assembly being connected to a seat suspension.

FIG. 2 illustrates the blower connection assembly 78 with the blower 80 partially connected to a bellow 100 via a connection adapter 120. The blower 80 includes a clip 84 that receives an adapter pivot 124 of the connection adapter 120. The connection adapter 120 rotates about the clip 84 towards the blower connector 96 so that a plate frame 154 is sandwiched between the connection adapter 120 and the blower 80. The plate frame 154 is part of a seat suspension 150 that includes a wire frame 152 and the plate frame 154 that includes a frame recess 156 so that the bellow 100 and the blower 80 are in fluid communication. The plate frame 154 includes additional frame recesses 156 that receive fasteners (not shown) that extends through the adapter recess 122 the frame recesses 156 and the blower connector 96 to connect the blower 80 and bellow 100 to the seat suspension 150. The bellow 100 includes a trim bag seat 108 that is configured to be in communication with a trim bag (not shown) and a blower seat 106 that extends through the connection adapter 120 into communication with the blower 80. The blower seat 106 acts as a locking feature 102 that connects the bellow 100 to the connection adapter 120.

Figure 3:
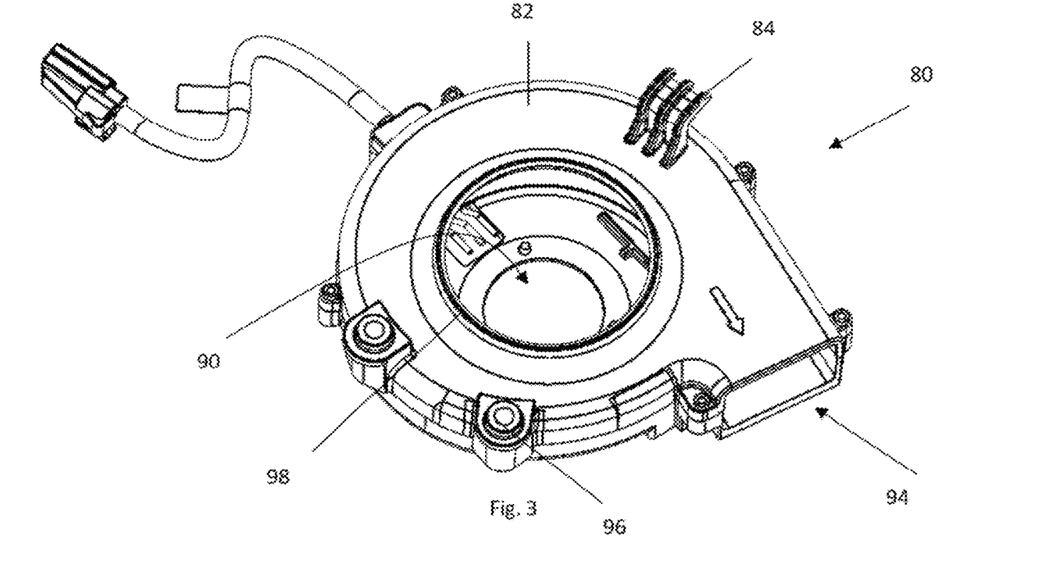
FIG. 3 is a perspective view of a blower.

FIG. 3 is a top perspective view of a blower 80 that includes an inlet 90 and an outlet 94. The blower 80 includes a housing 82 with a flange 98 around the inlet 90. The housing 82 also includes a clip 84 and blower connectors 96.

Figure 4A:
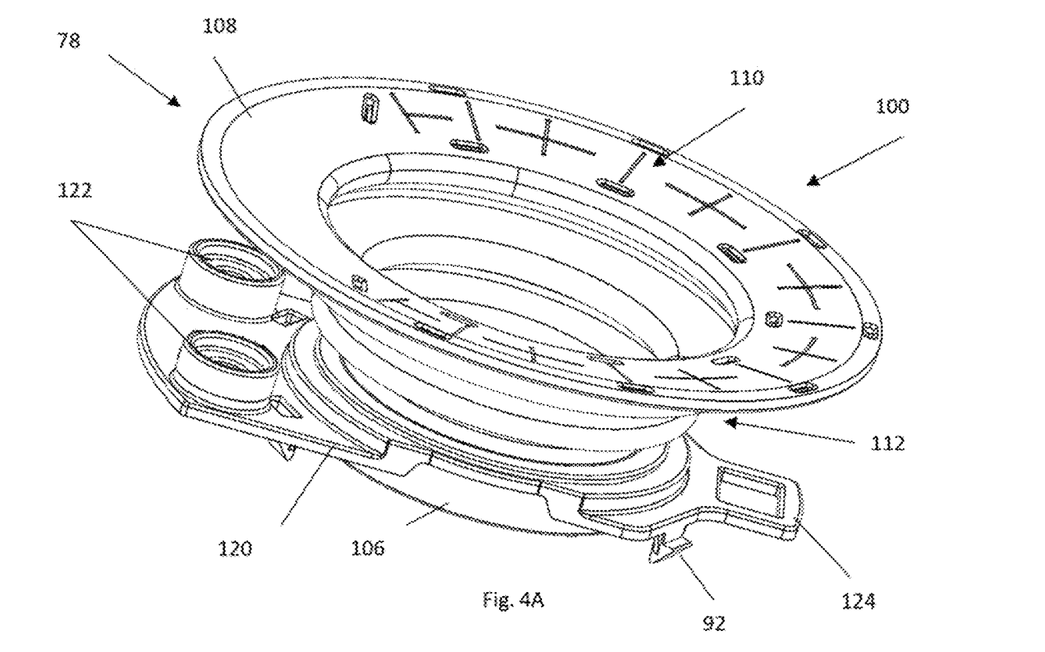
FIG. 4A is a perspective view of a one or more distribution members and connection adapter.

FIG. 4A illustrates the bellow 100 connected to a connection adapter 120. The bellow 100 includes a trim bag seat 108 with a plurality of stabilizing features 110 that assist in connecting the bellow 100 to a trim bag (not shown) and maintaining the bellow 100 in communication with a trim bag (not shown). The bellow 100 includes a blower seat 106 with a flexible region 112 between the trim bag east 108 and the blower seat 106. The blower seat 106 connects the bellows to the connection adapter 120. The connection adapter 120 includes an adapter pivot 124 that extends around a clip (not shown) of a blower. The connection adapter 120 includes a plurality of tabs 92 that connect the connection adapter 120 to the seat suspension (not shown) during assembly of the blower connection assembly 78. Adapter recesses 122 are located opposite the adapter pivot 124 and are configured to receive fasteners (not shown) that connect the connection adapter 120 to the blower (not shown).

Figure 4B:
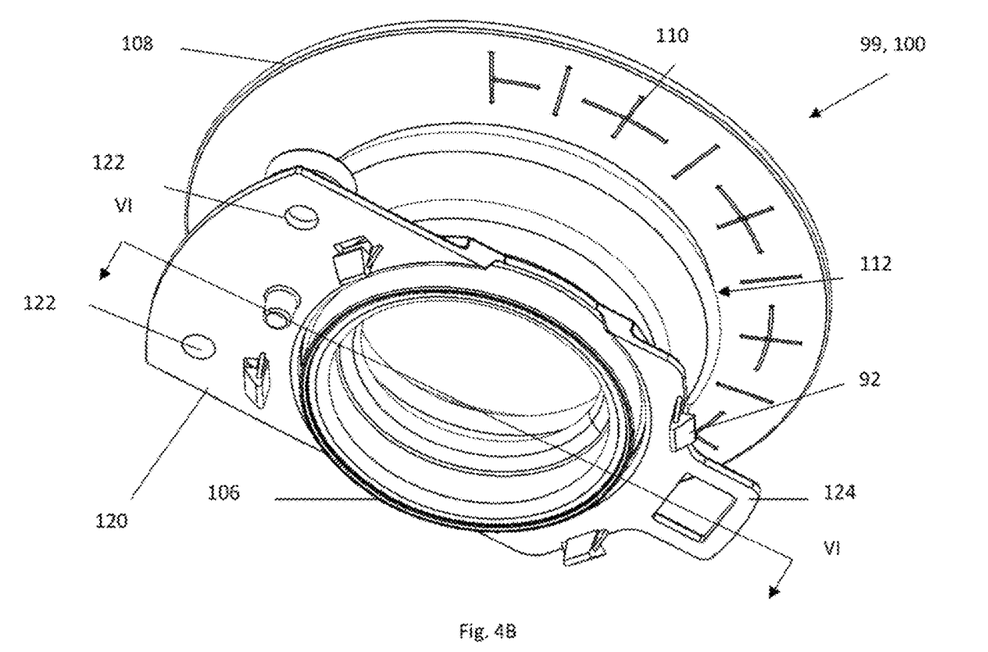
FIG. 4B is a bottom perspective view of a one or more distribution members and connection adapter.

FIG. 4B is a bottom perspective view of the distribution member 99, which is shown as a bellow 100 connected to the connection adapter 120. The distribution member 99 includes a trim bag seat 108 with a plurality of stabilizing features 110, a flexible region 112, and a blower seat 106 that connects the distribution member 99 to the connection adapter 120. The connection adapter 120 includes adapter recesses 122, an adapter pivot 124, and a plurality of tabs 92.

Figure 5:
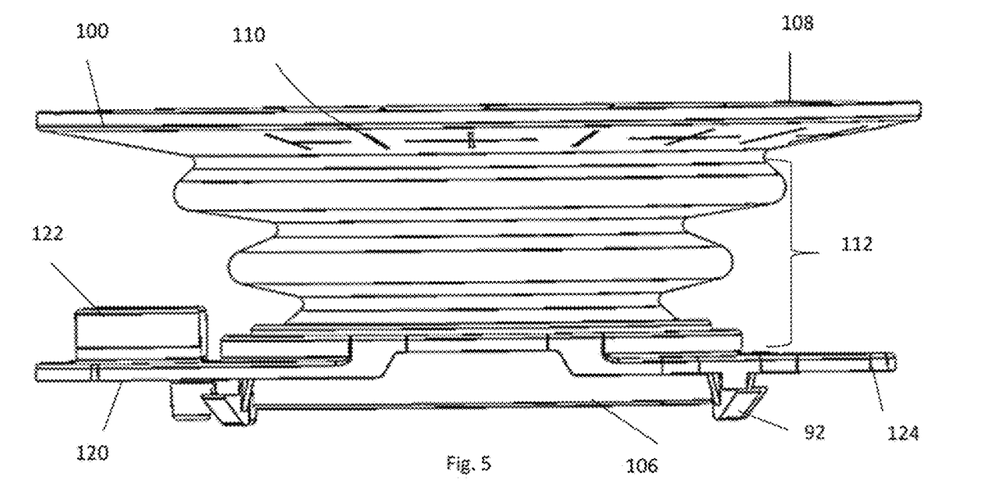
FIG. 5 is a side view of a one or more distribution members and connection adapter.

FIG. 5 is a side view of the bellow 100 and the connection adapter 120 connected together. The bellow 100 includes a trim bag seat 108 with stabilizing features 110, a blower seat 106 that connects the bellow 100 to the connection adapter 120, and flexible region 112 located therebetween. The connection adapter 120 includes an adapter recess 122, an adapter pivot 124, and a plurality of tabs 92 that assist in connecting the bellow 100 to a blower (not shown).

Figure 6:
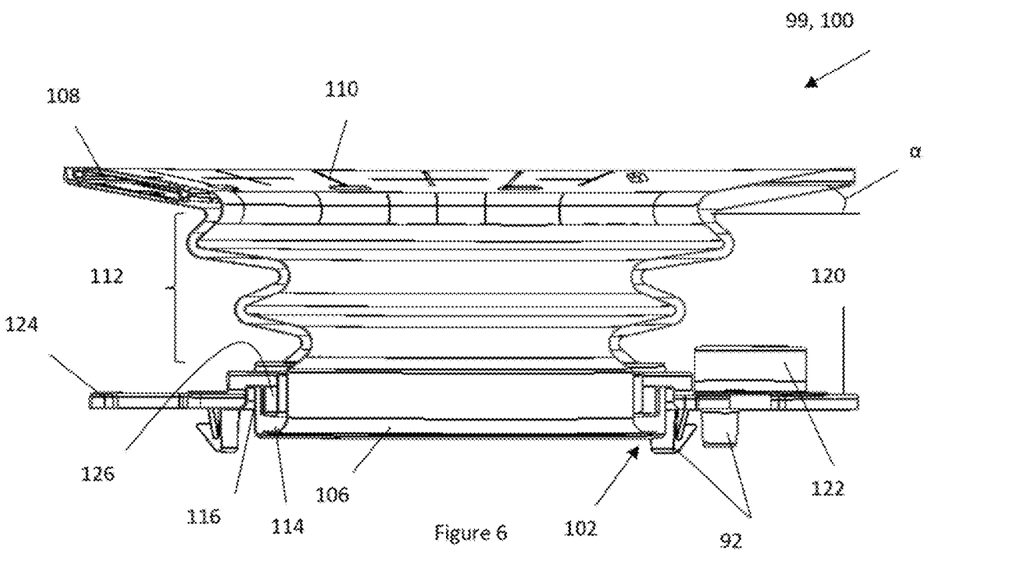
FIG. 6 is a cross-sectional view of FIG. 4B cut along line VI-VI.

FIG. 6 is a cross-sectional view of FIG. 4B along lines VI-VI showing the locking feature 102 that forms a connection between the distribution member 99 (e.g., bellow 100) and the connection adapter 120. The distribution member 99 includes a trim bag seat 108 with stabilizing features 110. The trim bag seat 108 extends outward and extends upward relative to a plane parallel to the connection adapter 120 at an angle (a). The distribution member 99 includes a flexible region 112 between the trim bag seat 108 and the blower seat 106. The distribution member 99 includes a connection recess 114 that receives a connection finger 126 of the connection adapter 120. An overlap feature 116 extends along a second side of the connection FIG. 126 to hold the distribution member 99 and the connection adapter 120 together. The connection adapter 120 includes an adapter pivot 124, an adapter recesses 122, and tabs 92 that assist in forming a connection with a ventilated trim bag (not shown).

Figure 7:
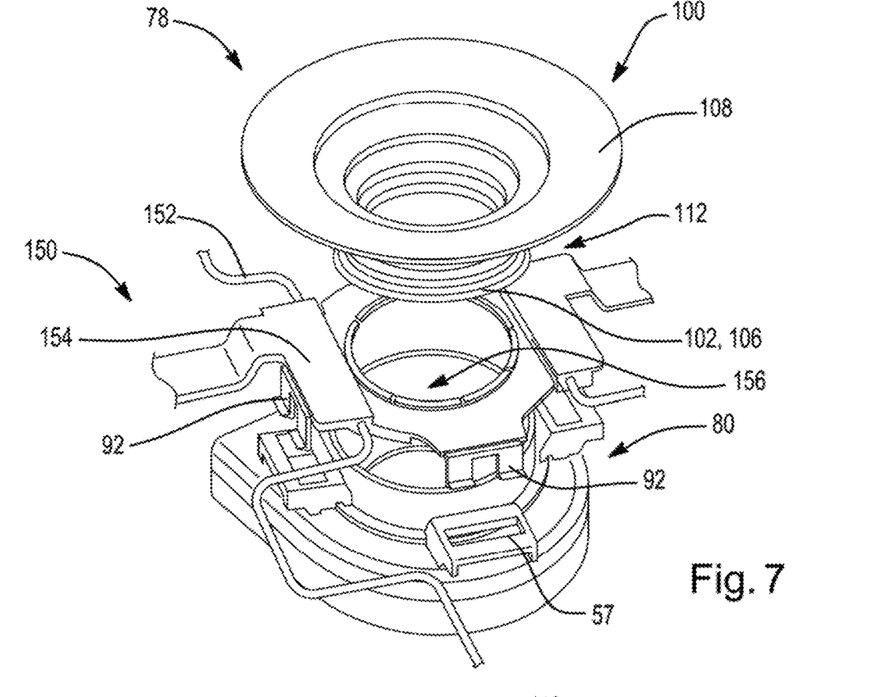
FIG. 7 is a partial exploded view of a one or more distribution members and blower connecting to a seat suspension.

FIG. 7 is an exploded view of a blower connection assembly 78 with the blower 80 and bellow 100 exploded from the plate frame 154. The seat suspension 150 includes a wire frame 152, and a plate frame 154 with a frame recess 156. The bellow 100 connects to the plate frame 154 by a locking feature 102, which is shown as a blower seat 106 extending into the frame recess 156 so that the bellow is retained in place. The bellow 100 includes a trim bag seat 108 opposite the blower seat 106 with a flexible region 112 therebetween. The plate frame 154 includes a plurality of tabs 92 that extend into attachment apertures 57 within the blower 80 so that the blower is connected to the seat suspension 150.

Figure 8:
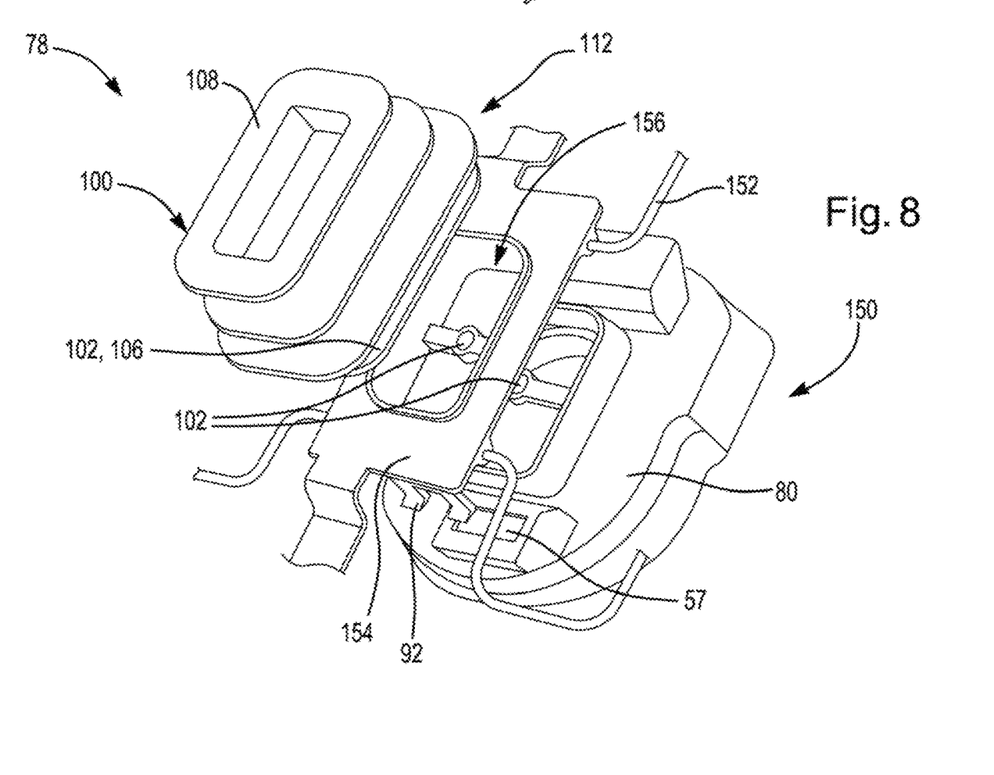
FIG. 8 is a partial exploded view of a one or more distribution members and blower connecting to a seat suspension.

FIG. 8 is an exploded view of a blower connection assembly 78 with the bellows 100 and blower 80 exploded from the plate frame 154. The bellow 100 includes a trim bag seat 108 with stabilizing features 110, a blower seat 106 that connects the bellow 100 to the plate frame 154, and a flexible region 112 located therebetween. The seat suspension 150 includes a wire frame 152, and a plate frame 154 with a frame recess 156. The plate frame 154 includes a plurality of tabs 92 that extend into attachment apertures 57 within the blower 80 so that the blower is connected to the seat suspension 150. The bellow 100, plate frame 154, and blower 80 include a locking feature 102 that a faster extend through to connect the bellow 100 and blower 80 to the plate frame 154.

Figure 9:
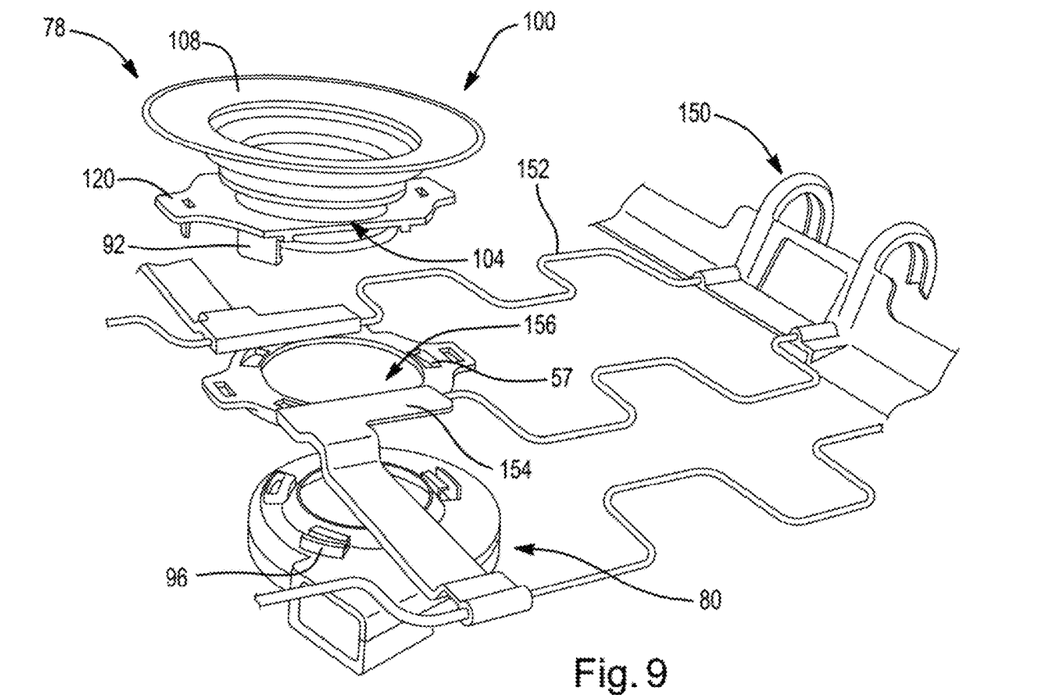
FIG. 9 is a partial exploded view of a one or more distribution members and blower connecting to a seat suspension.

FIG. 9 is an exploded view of a blower connection assembly 78 with the bellow 100 and blower 80 exploded from the plate frame 154. The bellow 100 is connected to a connection adapter 120 and the bellow 100 includes a trim bag seat 108 a plurality of flexing joints 104 that form a flexible region 112. The connection adapter 120 includes a plurality of tabs 92 that connect the bellow 100 to the plate frame 154 and the blower connectors 96 of the blower 80. The plate frame 154 includes a plurality of attachment apertures 57, which the tabs 92 connect to some and extend through some. The plate frame 154 is part of a seat suspension 150 that includes a wire frame 152 and a frame recess 156.

Figure 10:
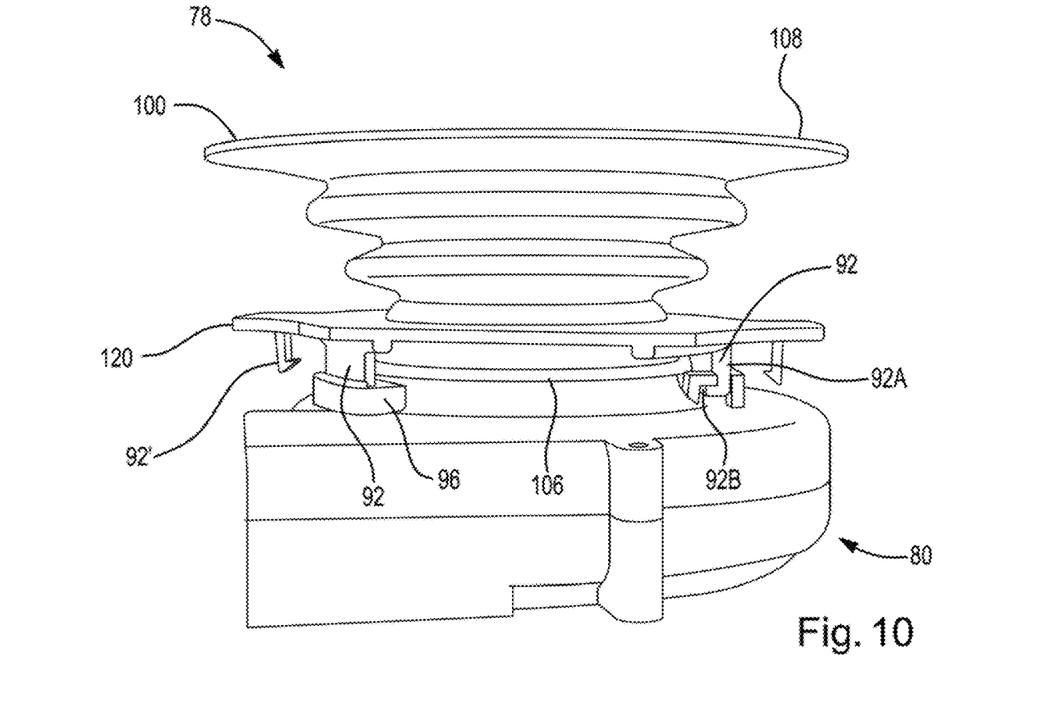
FIG. 10 is a perspective of a one or more distribution members connected to a blower by a connection adapter.

FIG. 10 is a side view of a blower connection assembly 78 with tabs 92 of the connection adapter 120 connected to the blower connector 96. The tabs 92 include a connection leg 92A that extend from the connection adapter 120 and a hook leg 92B that extends into blower connector 96 via twisting so that the bellow 100 and the blower 80 are connected together. The connection adapter 120 also includes a second set of tabs 92' that connect to the plate frame (not shown). The bellow 100 is connected to the connection adapter 120 by a blower seat 106 extending into the connection adapter 120. The bellow 100 also includes a trim bag seat 108.

Figure 11:
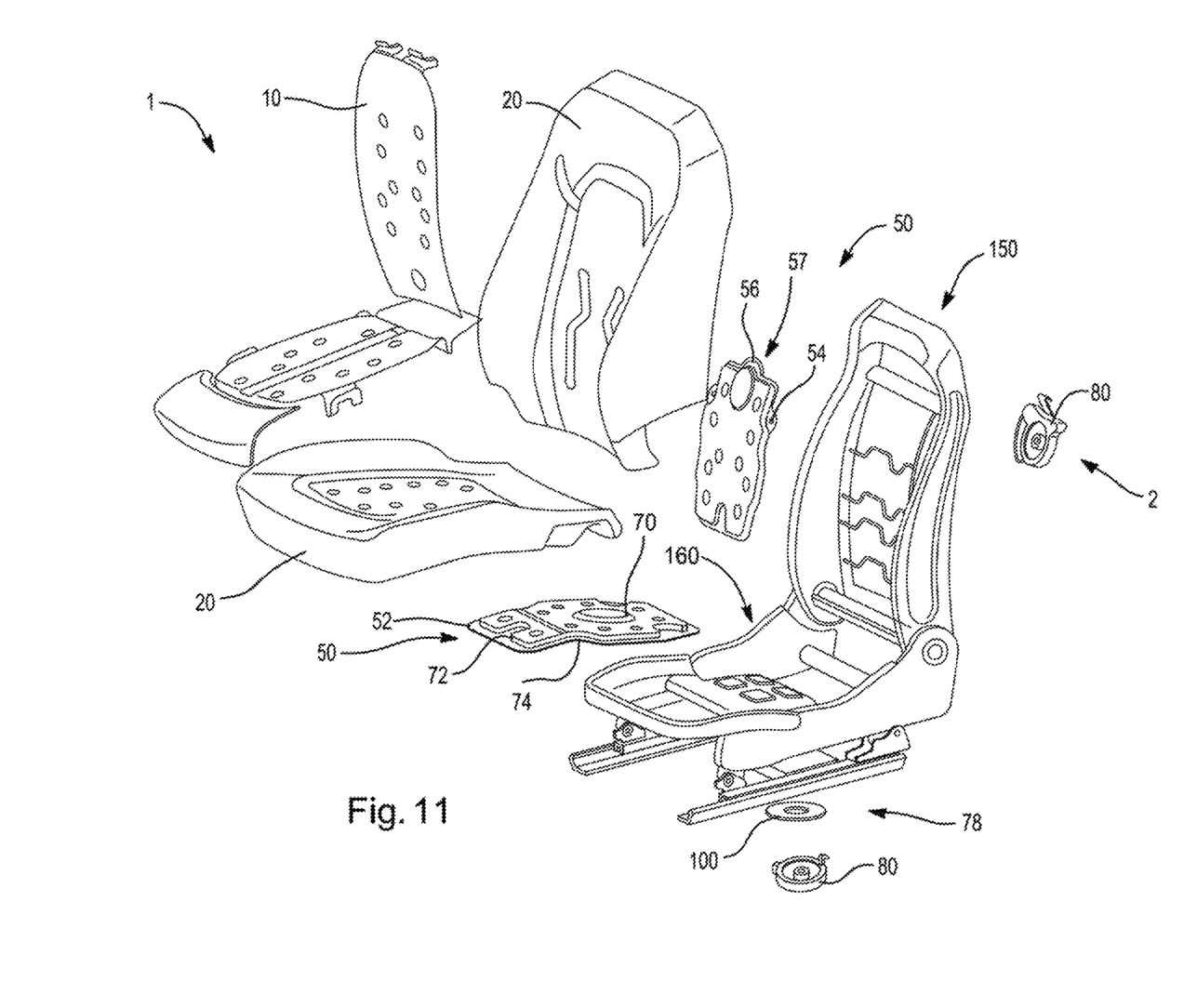
FIG. 11 is an exploded view of a seat assembly including a cushion and a conditioning system.

FIG. 11 is an exploded view of a seat assembly 1 including a conditioning system 2, cushion 20, a trim cover 10 extending over the cushion 20, and a ventilated trim bag 50. The cushion 20 is supported by a seat suspension 150. A ventilated trim bag 50 is located between the cushion 20 and the seat suspension 120. The ventilated trim bag 50 includes a top layer 70 and a bottom layer 74 with an insert layer 72 therebetween. The ventilated trim bag 50 also includes a seam 52 connecting the top layer 70 to the bottom layer 74; connection holes 54; and an attachment aperture 57 with an attachment ring 56. The conditioning system 2 includes a pair of blowers 80 that connect to the seat suspension 150 with a blower 80 beneath the seat being connected by a blower connection assembly 78 that includes a bellow 100. The seat suspension 150 includes expandable elements 160 that move the ventilated trim bag 50 relative to the blower 80, and the bellows 100 maintain the ventilated trim bag 50 and blower 80 in communication.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teaching should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

1 Seat Assembly
2 Conditioning System
10 Trim Cover
20 Cushion
50 Ventilated trim bag (insert)
52 Seam
54 Connection holes
56 Attachment ring
57 Attachment aperture
70 Top layer
72 Insert layer
74 Bottom layer
78 Blower Connection Assembly
80 Blower
82 housing
84 Clip
90 Inlet
92 Tabs
92A Connection Leg
92B Hook Leg
94 Outlet
96 Blower connector
98 Flange
99 Distribution Member
100 Bellow
102 Locking feature
104 Flexing joint
106 Blower Seat 108 Trim Bag Seat
110 Stabilizing Features
112 Flexible Region
114 Connection recess
116 Overlap feature
120 Connection Adapter
122 Adapter recess
124 Adapter pivot
126 Connection Finger
150 Seat Suspension
152 Wire frame
154 Plate frame
156 Frame recess
160 Expandable elements

We claim:

1. A blower connection assembly comprising:
 a. a distribution member;
 b. a connection adapter connected to the distribution member; and
 c. a blower that is connected to the distribution member via the connection adapter; and
wherein a portion of a seat suspension extends between the connection adapter and the blower to support the connection adapter, the blower, and the distribution member, and
wherein the blower includes one or more clips that extend into an adapter pivot of the connection adapter, or the connection adapter includes one or more clips that extend into an adapter pivot of the blower so that the connection adapter and the blower are rotatable relative to each other.

2. The blower connection assembly of claim 1, wherein the distribution member, the connection adapter, and the blower are free of a direct connection with the seat suspension.

3. The blower connection assembly of claim 1, wherein the connection adapter includes one or more adapter recesses and the blower includes one or more blower connectors that assist in connecting the blower to the connection adapter.

4. The blower connection assembly of claim 3, wherein a fastener extends through each of the one or more adapter recesses and each of the corresponding blower connectors so that each of the fasteners connect the connection adapter to the blower.

5. The blower connection assembly of claim 1, wherein the connection adapter includes one or more tabs that extend through the seat suspension to connect to the blower.

6. The blower connection assembly of claim 5, wherein the one or more tabs extend through a frame recess within a plate frame into communication with the blower so that the plate frame is locked between the blower and the connection adapter.

7. The blower connection assembly of claim 1, wherein the distribution member includes a blower seat that extends into contact with the blower to create a seal between the distribution member and the blower.

8. The blower connection assembly of claim 1, wherein a trim bag seat that extends into contact with a ventilated trim bag so that a seal is created between the distribution member and the ventilated trim bag.

9. The blower connection assembly of claim 1, wherein the distribution member is a bellow.

10. A blower connection assembly comprising:
 a. a distribution member that extends into and connects to a portion of a seat suspension; and
 b. a blower that connects to the portion of the seat suspension so that the distribution member and the blower are in fluid communication; and
wherein a blower seat of the distribution member is sandwiched between the blower and the portion of the seat suspension so that a seal is formed between the distribution member and the blower; and
wherein a fastener extends through a portion of the distribution member and the seat suspension to form a fixed connection.

11. The blower connection assembly of claim 10, wherein the blower includes one or more attachment apertures that receives one or more tabs of the seat suspension or the blower includes one or more labs that extend into one or more attachment apertures of the seat suspension.

12. The blower connection assembly of claim 10, wherein the distribution member includes a locking feature that locks the distribution member to the seat suspension.

13. The blower connection assembly of claim 10, wherein the distribution member includes a trim bag seat that forms a seal with a ventilated trim bag and a flexible region between the trim bag seat and the blower seat.

14. The blower connection assembly of claim 10, wherein the distribution member is round, square, or rectangular.

15. The blower connection assembly of claim 13, wherein the distribution member tapers inward as the distribution member extends from the blower seat to the trim bag seat or the distribution member extends outward as the distribution member extends from the blower seat to the trim bag seat.

16. The blower connection assembly of claim 10, wherein the distribution member is a bellow.

17. A blower connection assembly comprising:
 a. a distribution member;
 b. a connection adapter connected to the distribution member and a portion of a seat suspension; and
 c. a blower that is connected to the distribution member via the connection adapter;
wherein the portion of the seat suspension extends between the connection adapter and the blower to support the connection adapter, the blower, and the distribution member,
wherein the blower includes one or more adapter recesses or one or more tabs and the connection adapter includes one or more adapter recesses or one or more tabs, and
wherein the blower includes one or more adapter recesses or one or more tabs and the connection adapter includes one or more adapter recesses so that the connection adapter and the blower are directly connected.

18. The blower connection assembly of claim 17, wherein the distribution member includes a blower seat that extends through the connection adapter.

19. The blower connection assembly of claim 18, wherein the blower includes a flange that is in communication with the blower seat to form a sealed connection between the distribution member and the blower.

20. The blower connection assembly of claim 17, wherein the connection adapter is a locking feature that fixedly connects the distribution members and the connection adapter.

* * * * *